United States Patent [19]
Sasai et al.

[11] Patent Number: 5,647,777
[45] Date of Patent: Jul. 15, 1997

[54] CONNECTOR ASSEMBLY FOR A RETAINER, A METHOD FOR PRODUCING THE SAME, AND A MOLDING DIE FOR PRODUCING THE SAME

[75] Inventors: Osamu Sasai; Hajime Kawase; Yasunori Wada; Shinsuke Tsutsui, all of Yokkaichi, Japan

[73] Assignee: Sumitomo Wiring Systems, Ltd., Yokkaichi, Japan

[21] Appl. No.: 616,200

[22] Filed: Mar. 15, 1996

[30] Foreign Application Priority Data

| Mar. 16, 1995 | [JP] | Japan | 7-086152 |
| Mar. 16, 1995 | [JP] | Japan | 7-086153 |
| Mar. 16, 1995 | [JP] | Japan | 7-086154 |

[51] Int. Cl.$^6$ ............................................. H01R 13/436
[52] U.S. Cl. ............................................................. 439/752
[58] Field of Search ................................... 439/752, 595

[56] References Cited

U.S. PATENT DOCUMENTS

| 5,120,269 | 6/1992 | Endo et al. | 439/752 |
| 5,316,504 | 5/1994 | Jinno | 439/752 |
| 5,501,619 | 3/1996 | Sakatani et al. | 439/752 |

FOREIGN PATENT DOCUMENTS

| 57-135133 | 8/1982 | Japan. |
| 2-29011 | 6/1990 | Japan. |

Primary Examiner—Gary F. Paumen
Attorney, Agent, or Firm—Oliff & Berridge

[57] ABSTRACT

A connector assembly includes a connector housing and a retainer that straddles the connector housing. The retainer is attached on the upper face of the connector housing. The retainer includes engagement projections, which engage with terminal pieces in the connector housing, to prevent the retainer from slipping out of the connector housing. The dimensions of the connector are set so a gap is formed between the engagement projections and the outer face of the connector housing. A separation plate of a molding die can be positioned in the gap, so the connector housing and the retainer can be simultaneously molded in an assembled relationship with the retainer separated from the connector housing. A molding die and method of producing the connector assembly are also disclosed.

19 Claims, 10 Drawing Sheets

CONNECTOR ASSEMBLY FOR A RETAINER, A METHOD FOR PRODUCING THE SAME, AND A MOLDING DIE FOR PRODUCING THE SAME

BACKGROUND OF THE INVENTION

1. Field of the Invention

The invention relates to a connector assembly with a connector and a retainer. The retainer is attached to an outer face of a connector housing, so as to straddle the connector housing and retain a terminal in the connector housing. The invention also relates to a method for producing the connector and a molding die used to produce the connector.

2. Description of Related Art

Figure 15:
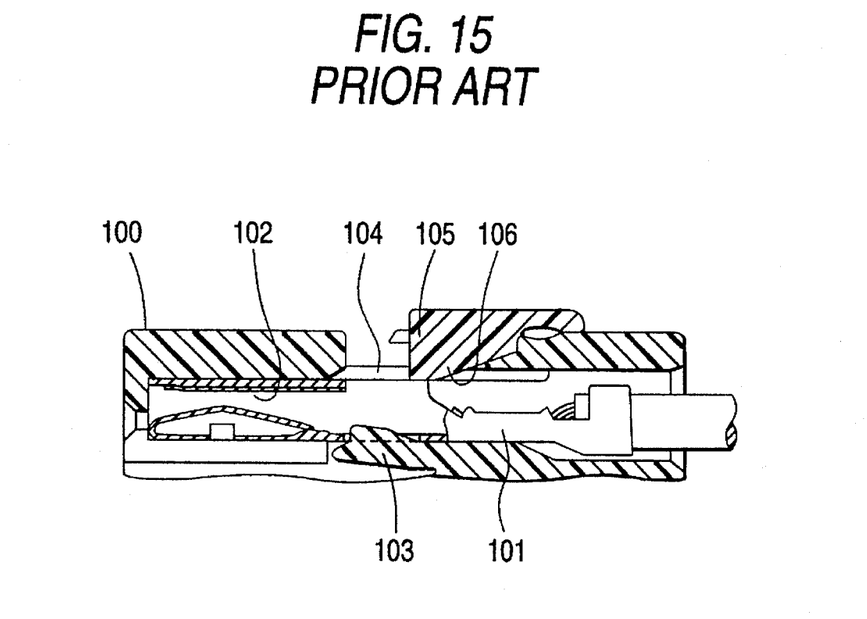
FIG. 15 is a section view illustrating a prior art connector with a retainer in a provisional engagement position.

A known connector with a retainer is illustrated in FIG. 15. The connector includes a terminal chamber 102 formed in a connector housing 100, a terminal piece 101 is inserted into the terminal chamber 102. A lance 103 is formed in the terminal chamber 102 and is cantilevered so as to be flexibly deformable and engageable with the terminal piece 101. When the terminal piece 101 is inserted into the connector housing 100, the lance 103 deflects toward a lower face of the connector housing 100 so as to be retracted. When the terminal piece 101 is further inserted to a normal insertion position in the connector housing 100, the lance 103 returns to its undeformed position and engages the terminal piece 101.

An opening 104 is formed in an upper face of the connector housing 100 and communicates with the terminal chamber 102. A retainer 105 is movably attached to an upper portion of the connector housing 100 to close the opening 104. An engagement projection 106 projects from the retainer 105 and is insertable into the terminal chamber 102 through the opening 104. The retainer 105 is movable between two positions, a provisional engagement position (FIG. 15), where the engagement projection 106 is inserted a shallow amount into the connector housing 100, and a regular engagement position (FIG. 16), where the engagement projection is deeply inserted into the connector housing 100.

Figure 16:
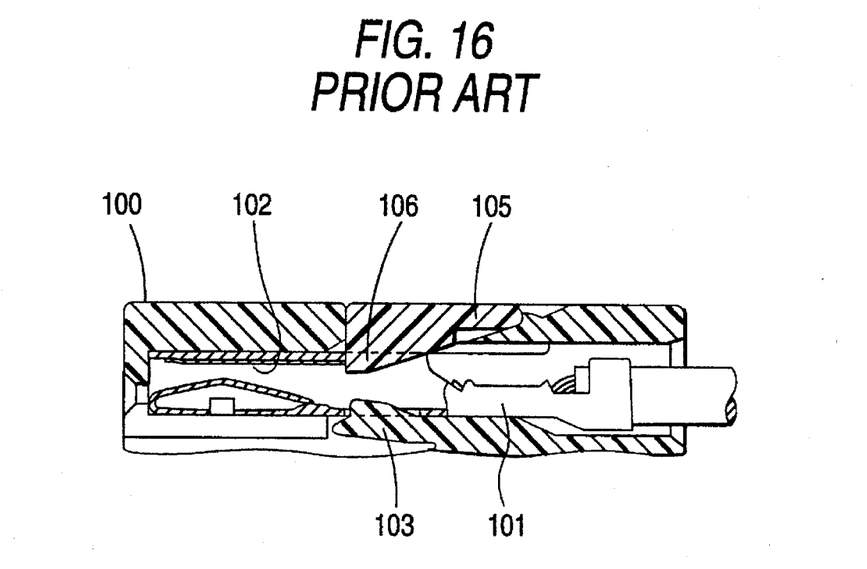
FIG. 16 is a section view illustrating the prior art connector with the retainer in a regular engagement position.

When the retainer 105 is in the provisional engagement position, the engagement projection 106 is positioned in the opening 104. However, the engagement projection 106 does not enter a pathway for the terminal piece 101 defined in the terminal chamber 102. Thus, the terminal piece 101 can be inserted or extracted from the connector housing 100. However, in the regular engagement position, the engagement projection 106 is deeply inserted into the terminal chamber 102 and engages the terminal piece 101. Thus, the terminal piece 101 is prevented from slipping out of the connector housing 100.

Conventionally, when a connector having the above structure is produced, the connector housing 100 and the retainer 105 are either separately molded or molded by different molding machines. They are then transported to an assembling station to be assembled. This assembling process may be conducted automatically by a machine having a parts feeder, or manually by a worker.

In known connectors, the molding and assembly of the connector housing 100 and the retainer 105 are individually performed. A complete product is obtained after conducting processes such as molding, transportation, and assembly. When these components are manually assembled by a worker, an inspection step is also required. Therefore, the complete product is obtained after conducting a number of production steps, with a high production cost. Furthermore, the molding dies for the connector housing 100 and the retainer 105 must be individually designed, managed, maintained and kept uniform. Thus, the cost for managing the molding dies increases the production costs.

Moreover, in a resin product, such as a connector and housing in which a plurality of parts are assembled and relatively movable, the parts must be separated from each other in their assembled state. However, known connectors of the type described above, have a configuration where the engagement projection 106 of the retainer 105 enters the terminal chamber 102 of the connector housing 100 and interferes with the terminal piece 101, i.e., the parts are not separated. Therefore, it is virtually impossible to mold a connector in which the connector housing 100 and the retainer 105 are assembled while separate from each other, while maintaining their assembled state.

SUMMARY OF THE INVENTION

In view of the above noted problems, the inventors have developed a technique in which a connector housing and retainer for a connector assembly are simultaneously molded in one molding die. Thus, the cumbersome steps of separately molding, transporting, and assembling the individual parts are reduced.

Therefore, it is an object of the invention to provide a connector assembly having a connector housing and retainer, that allows the connector housing and the retainer to be simultaneously molded separate from each other but in an assembled condition. This enables the production cost to be greatly reduced. It is another object of the invention to provide a production method and a molding die that can efficiently and effectively produce the connector assembly.

The connector assembly comprises a connector that includes a connector housing and a retainer. The retainer has a pair of side pieces that are placed on both sides of the connector housing. The retainer is attached to the connector housing and is movable between a provisional engagement position and a regular engagement position, The retainer also has an engagement projection, which, when the retainer reaches the regular engagement position, holds and prevents a terminal piece that is disposed in the connector housing from slipping out of the connector housing. The engagement projection of the retainer is configured to permit a gap to be left or formed between the engagement projection and an outer face of the connector housing, when the retainer is in the provisional engagement position.

In a resin product, in which a plurality of movable parts are assembled, the movable parts must be separated by a clearance in their assembled state. Therefore, another object of this invention is achieved by providing a connector assembly comprising a connector housing and a retainer. The retainer is attached to sides of the connector housing so as to straddle the connector housing. The retainer also has an engagement projection for preventing a terminal piece from slipping out of the connector housing. The engagement projection has an engagement projection that enters a cavity of the connector housing to interact with the terminal piece.

Previously, it has been practically impossible to mold a connector assembly in which two components are assembled together with a clearance separation while maintained in their assembled state. The connector according to the invention includes configurations and dimensions so that when the retainer is in a provisional engagement position, a gap is formed between the engagement projection and an outer face of the connector housing. Therefore, a part of a molding die can enter the gap during molding to enable the connector housing and the retainer, which is molded in the provisional engagement position, to be simultaneously molded with the retainer attached to the connector housing.

The method of producing a connector assembly comprises producing a connector assembly as a resin molded product, where the connector assembly comprising a connector housing and a retainer. The retainer has a pair of side pieces that are placed on both sides of the connector housing. The retainer is attached to the connector housing and is movable between a provisional engagement position and a regular engagement position. The retainer further includes an engagement projection which, when the retainer reaches a regular engagement position, holds a terminal piece in the connector housing to a position to prevent it from slipping out of the connector housing. The method further includes setting dimensions, which when the retainer is in the provisional engagement position, allows a gap to be formed between the engagement projection and an outer face of the connector housing. The method also moves a part of a molding die into the gap, thereby molding the connector housing and the retainer together with the retainer is attached to the connector housing.

A further object of the invention is achieved by providing a molding die for producing a connector assembly. The molding die produces a connector assembly that includes a connector housing and a retainer. The retainer has a pair of side pieces that are placed on both sides of the connector housing. The retainer is attached to the connector housing and is movable between a provisional engagement position and a regular engagement position. The retainer further includes an engagement projection which, when the retainer reaches the regular engagement position, holds a terminal piece in the connector housing in a position when the terminal piece is prevented from slipping out of the connector housing. The connector assembly has dimensions which, when the retainer is at the provisional engagement position, allow a gap to be formed between the engagement projection and an outer face of the connector housing. The molding die comprises a separation plate, which is elongated in mold closing and opening directions. The separation plate enters the gap, and thereby allows the connector housing and the retainer to be molded, where the retainer is separated from the connector housing in their assembled state.

As described above, and the connector housing and the retainer can be simultaneously molded with the retainer is attached to the connector housing. Therefore, the step of manual or machine attachment of the retainer to the connector housing is not necessary. Thus, the production cost can be largely reduced.

Other objects, advantages and salient features of the invention will become apparent from the following detailed description, which, taken in conjunction with the annexed drawings, disclose preferred embodiments of the invention.

BRIEF DESCRIPTION OF THE DRAWINGS

The invention will be described in detail with reference to the following drawings in which like reference numerals refer to like element and wherein.

DETAILED DESCRIPTION OF PREFERRED EMBODIMENTS

Hereinafter, a first preferred embodiment of the invention will be described with reference to FIGS. 1 to 12.

Figure 1:
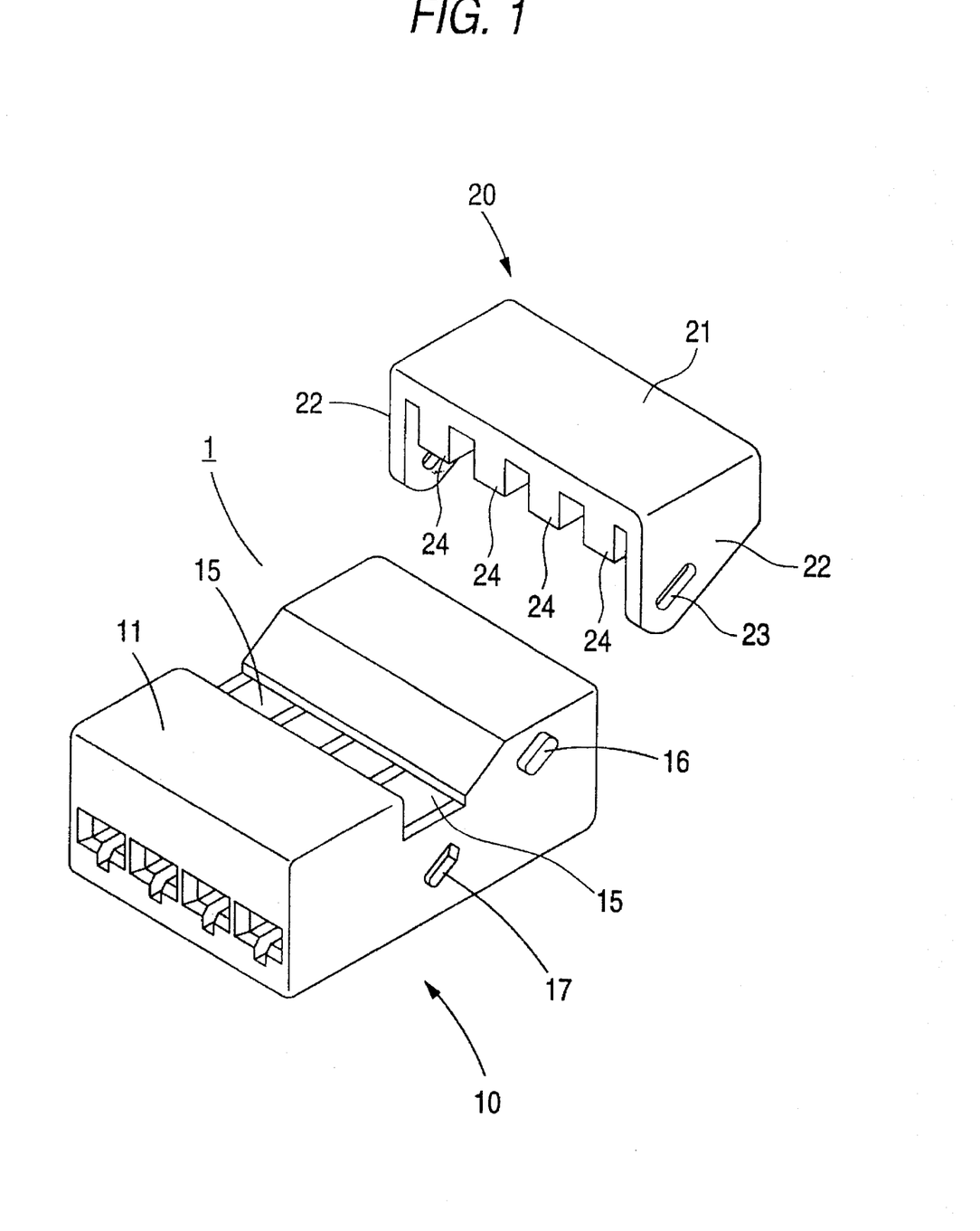
FIG. 1 is an exploded perspective view illustrating a connector assembly produced by a molding die in a first preferred embodiment of the invention.

A connector assembly 1 that is produced by a molding die M according to the invention will be initially described. The connector assembly includes a connector housing 10, as shown in FIG. 1 in the form of a female connector housing. A fitting portion 11 is formed on a front area of the connector housing 10. The fitting portion 11 is inserted into a hood of a male housing (not shown). A plurality of terminal chambers 12, for example four terminal chambers, that accommodate terminal pieces (see FIG. 5), are formed in the fitting portion 11, and pass through the fitting portion 11 in the longitudinal direction.

A lance 13 is formed in each terminal chamber 12. The lance 13 can be flexibly downwardly deformed to be retracted from the terminal chamber 12. The lance 13 can engage a terminal piece 2, which is inserted into each terminal chamber 12. The front end of each lance 13 is partly cut away or removed to form an engaging part 14 that engages the terminal piece 2.

Each terminal piece 2 is a female terminal and has a structure well-known in the art. The terminal piece 2 includes a connection tube 2a into which a male terminal piece (not shown) can be inserted. The connector tube 2a is formed at a front end of the terminal piece 2 and an engaging hole 2b, which is to be engaged with a corresponding lance 13, is formed in a lower face of the connection tube 2a. The terminal piece 2 also includes a jaw 2c that engages an engagement projection 24 of a retainer 20 (described hereinafter). The jaw 2c is formed in an upper face of the terminal piece 2.

An upper face of the connector housing 10, which is behind the fitting portion 11, includes slit-like openings 15.

Openings 15 have a predetermined length to communicate with a respective terminal chamber 12. The openings 15 allow engagement projections 24, which are formed on a back face of the retainer 20, to protrude into the terminal chambers 12, when the retainer 20 is at a regular engagement position (described hereinafter). Thus, the engagement projections 24 can engage a terminal piece 2.

Figure 6:
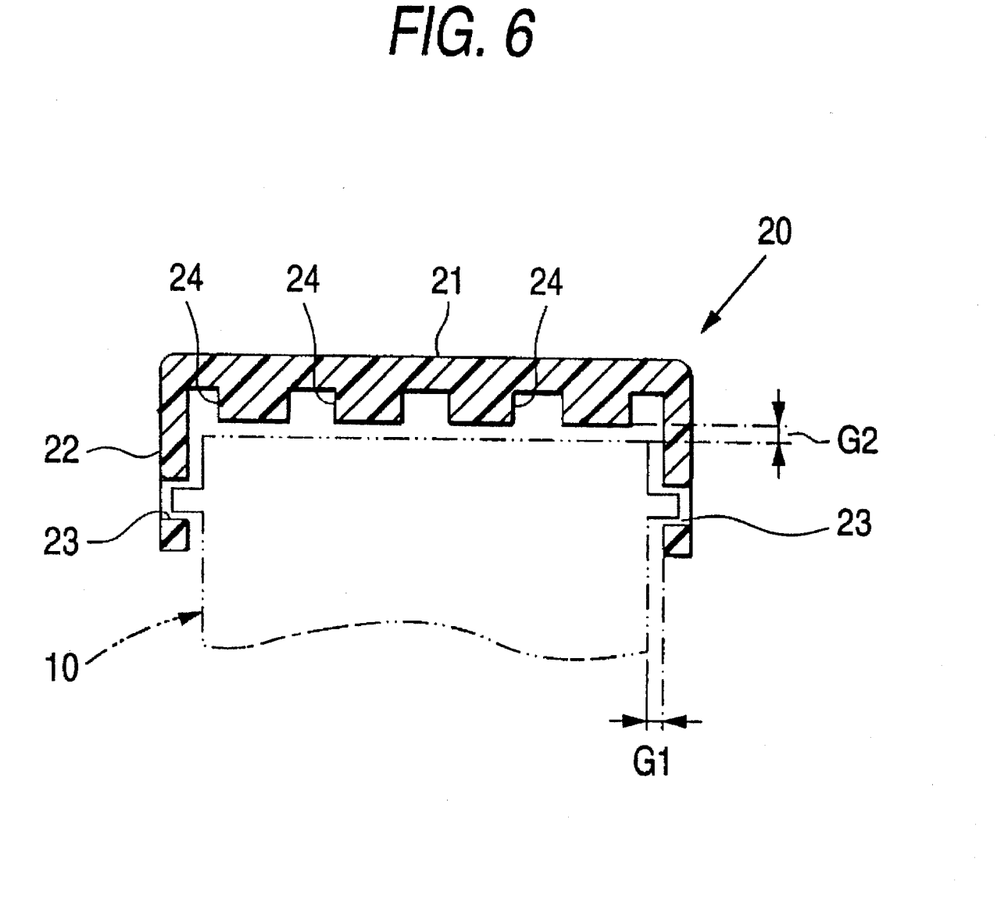
FIG. 6 is a section view taken along line VI—VI of FIG. 2.

The retainer 20 is attached to an upper face at a rear area of the connector housing 10. The retainer 20 is separate from but simultaneously molded with the connector housing 10, with the retainer 20 attached to the connector housing 10 (described hereinafter). The retainer 20 comprises a pair of side pieces 22, which extend from at the right and left sides of a main part 21, respectively. The distance between the side pieces 22 is slightly larger than the distance between the right and left side faces of the connector housing 10. As a result, when the retainer 20 straddles the connector housing 10, predetermined gaps G1 are formed between the inner side faces of the side pieces 22 of the retainer 20 and the outer side faces of the connector housing 10, respectively (FIG. 6).

Figure 2:
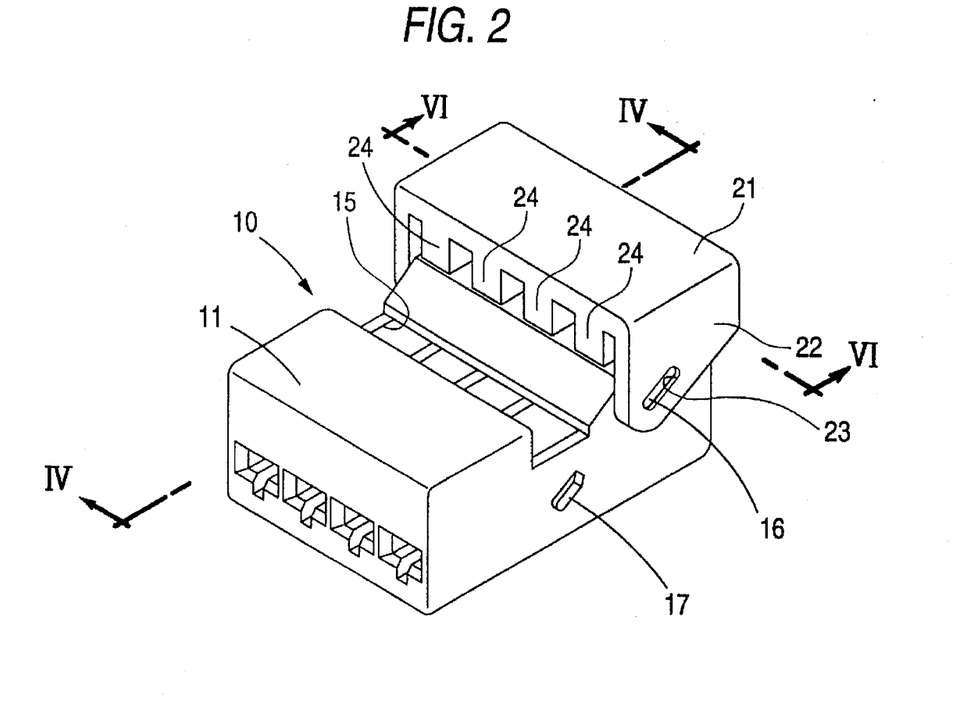
FIG. 2 is a perspective view of the connector assembly where a retainer is attached to a connector housing.
Figure 3:
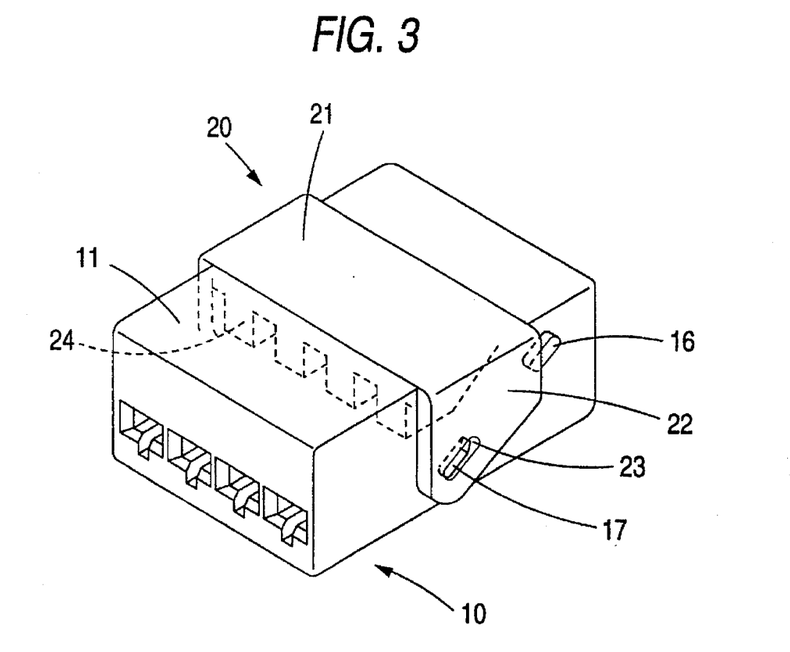
FIG. 3 is a perspective view of the connector assembly showing with the retainer is moved to a regular engagement position.

An open slit 23 is formed in each of the side pieces 22 and slants to the left (FIG. 1). In order to position the retainer 20 attached to the connector housing 10, first and second engaging projections 16 and 17 project from each of the right and left side faces of the connector housing 10 (FIGS. 1-3). The positions of the engaging projections 16 and 17 correspond to the slits 23 formed in the side pieces 22 of the retainer 20. The projections 16 and 17 each have a substantially equal width that is smaller than the opening width of the slits 23 of the retainer 20. The projections 16 and 17 are substantially equal in length to each other and are slightly shorter than the slits 23. Consequently, each slit 23 can be moved between a position where it engages the first engaging projection 16, the provisional engagement position (FIG. 2), and a position where it engages the second engaging projection 17, the regular engagement position (FIG. 3).

The lower face of the main part 21 of the retainer 20 includes a plurality of engagement projections 24. The projections 24 projected into the corresponding terminal chambers 12 through openings 15 of the connector housing 10. Each projection 24 extends at pitches substantially equal to that of the terminal chambers 12. Each engagement projection 24 projects in a tapered fashion toward the insertion end of the corresponding terminal chamber 12.

Figure 4:
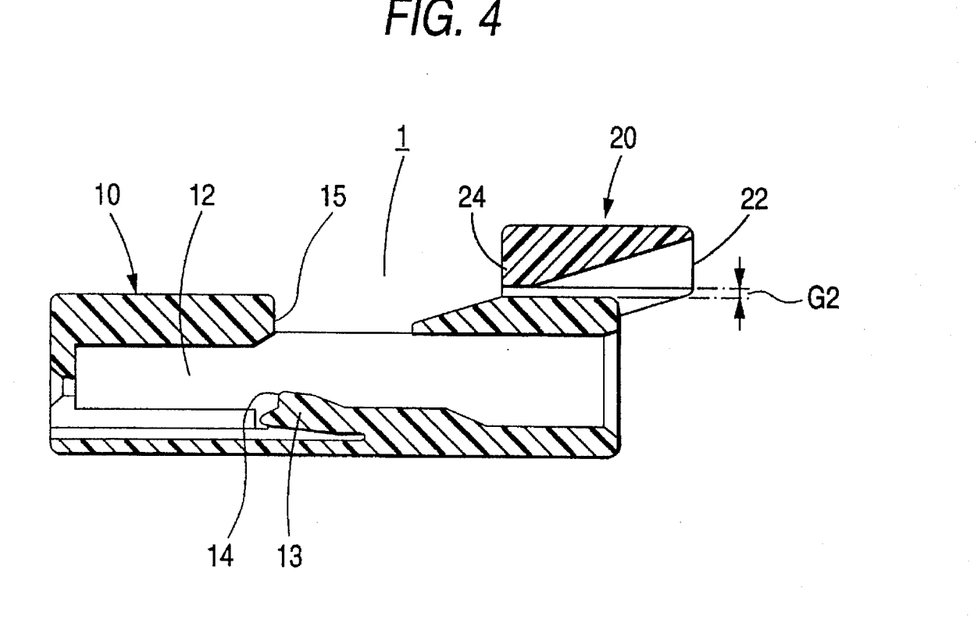
FIG. 4 is a section view taken along line IV—IV of FIG. 2.
Figure 5:
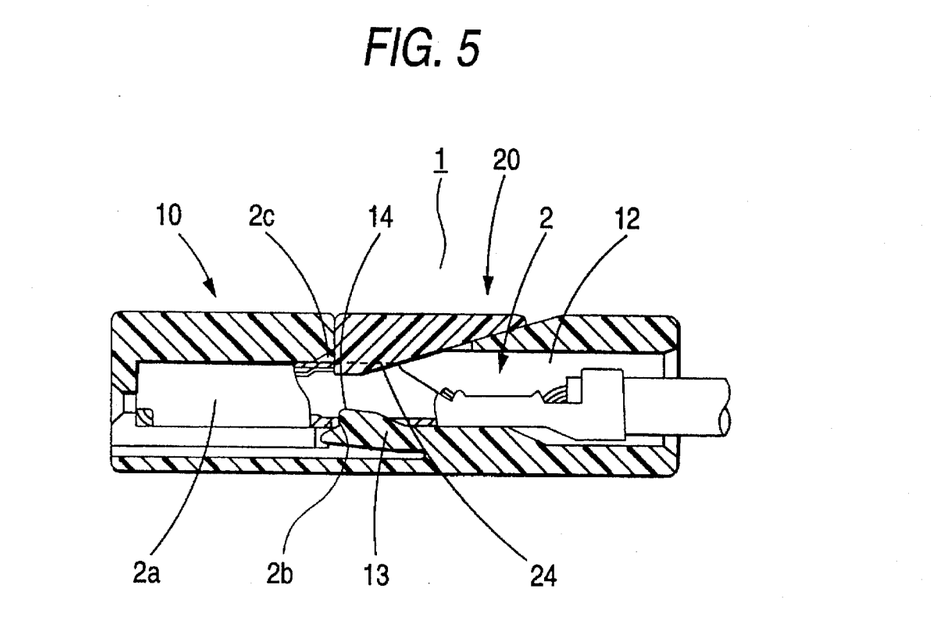
FIG. 5 is a section view of the connector assembly with the retainer in the regular engagement position.

When the retainer 20 is in the provisional engagement position, the engagement projections 24 do not fully project into the terminal chambers 12. Thus, the terminal pieces 2 can be inserted or extracted from the terminal chambers 12. When the retainer 20 is in the regular engagement position, each engagement projection 24 projects fully into the terminal chamber 12. The engagement projection engages a jaw 2c of a corresponding terminal piece 2 (FIG. 5). Thus, the terminal piece 2 is prevented from slipping out of the terminal chamber 12. This position is maintained by a double engagement between: 1) the jaw 2c of the terminal piece 2 and the lance 13; and 2) the terminal piece 2 and the engagement projection 24 of the retainer 20. The dimensions of the engagement projections 24 and the thickness of the fitting portion 11 of the connector housing 10 are such that when the retainer 20 is in the provisional engagement position, a gap G2 is formed between the engagement projections 24 and the outer face of the connector housing 10 (FIGS. 4 and 6).

Next, the molding die for producing the connector, wherein the connector housing 10 and the retainer 20 are simultaneously molded with the retainer attached to the connector housing, and the production method will be described with reference to FIGS. 7–12. The connector assembly 1 is produced by any suitable and known injection molding method. The structure of a molding die M is incorporated in the injection molding system.

Figure 7:
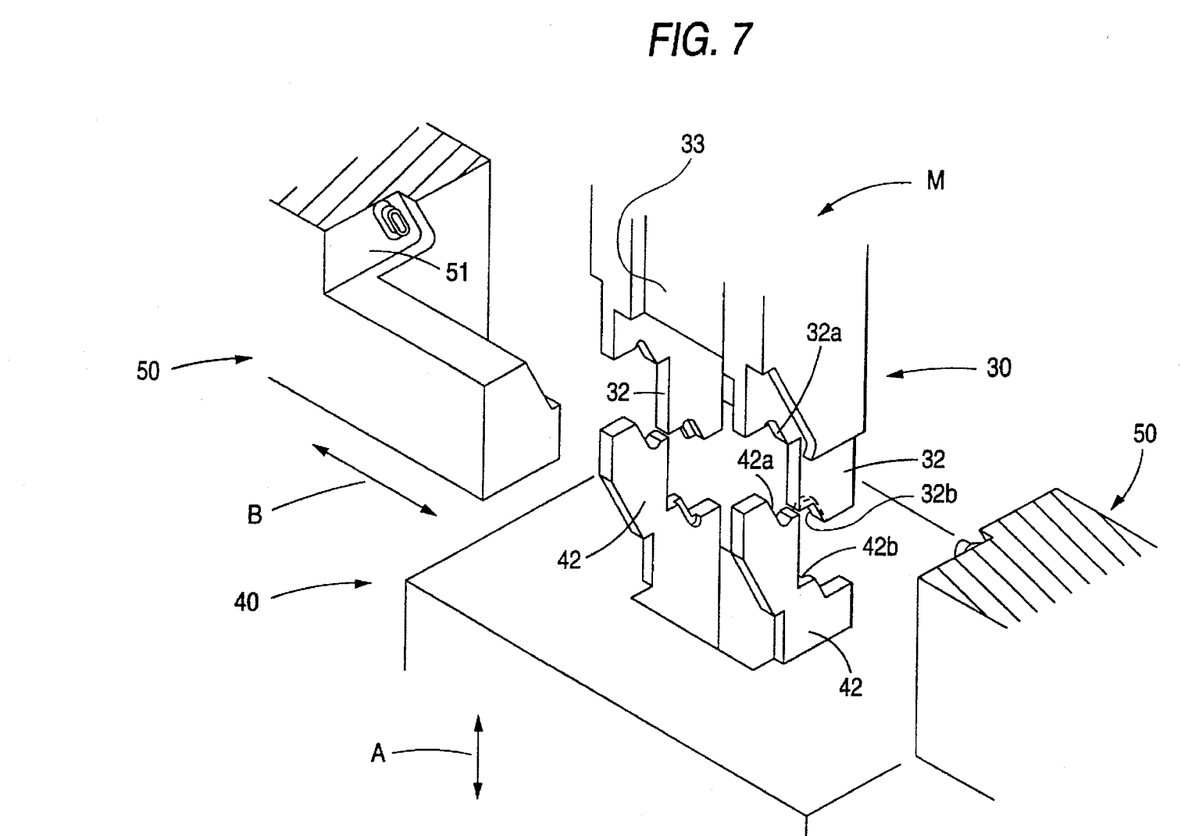
FIG. 7 is a perspective view illustrating the molding die in an opened state.
Figure 8:
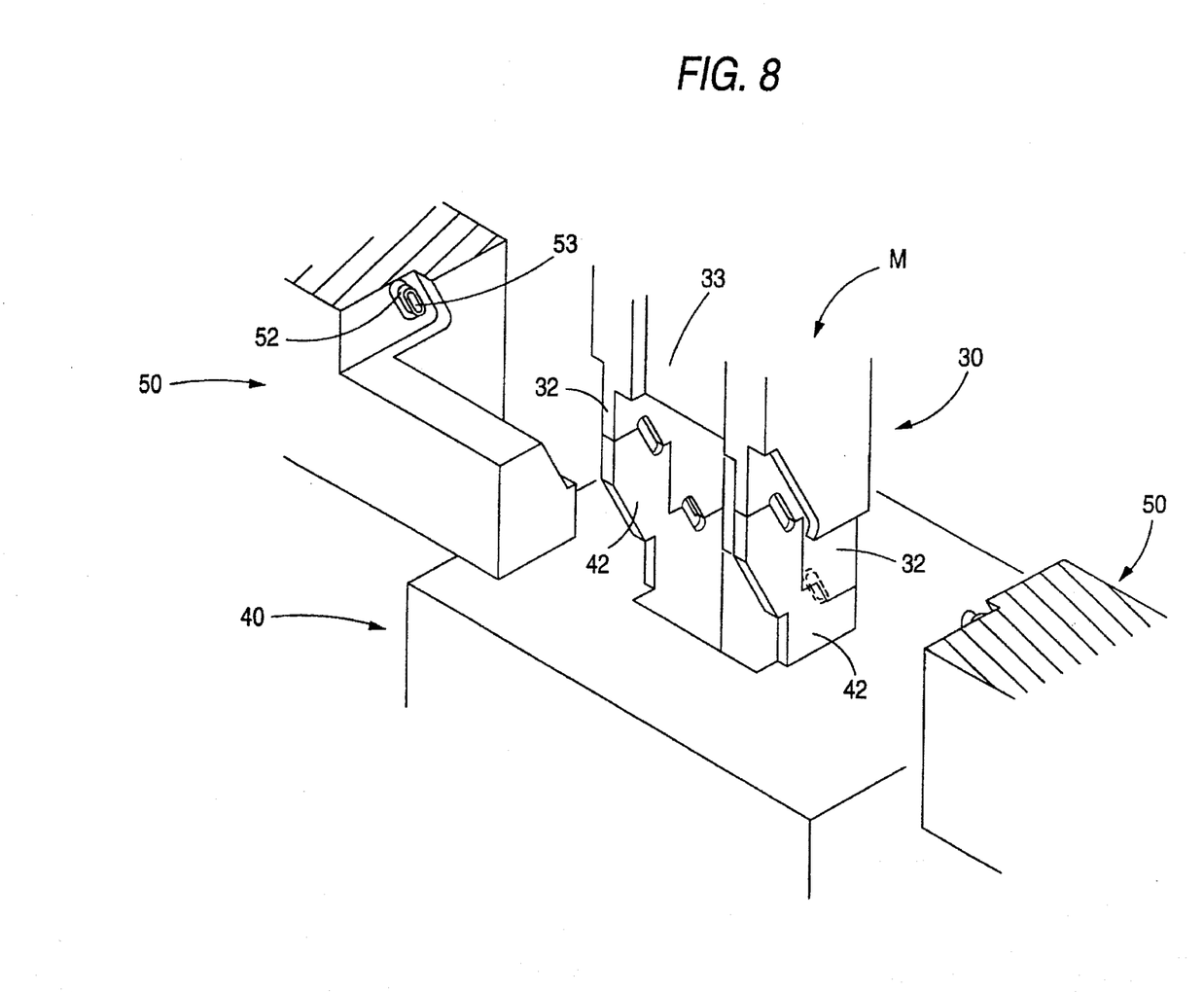
FIG. 8 is a perspective view illustrating the molding die with a stationary mold and a movable mold closed and slide molds opened.
Figure 10:
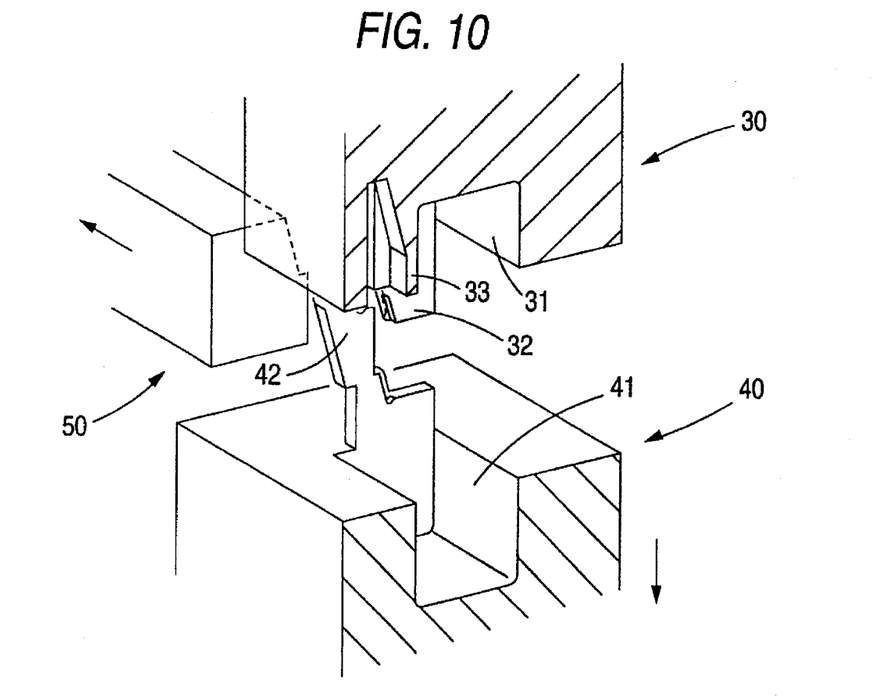
FIG. 10 is a perspective view in partial section illustrating the molding die in an opened state.
Figure 11:
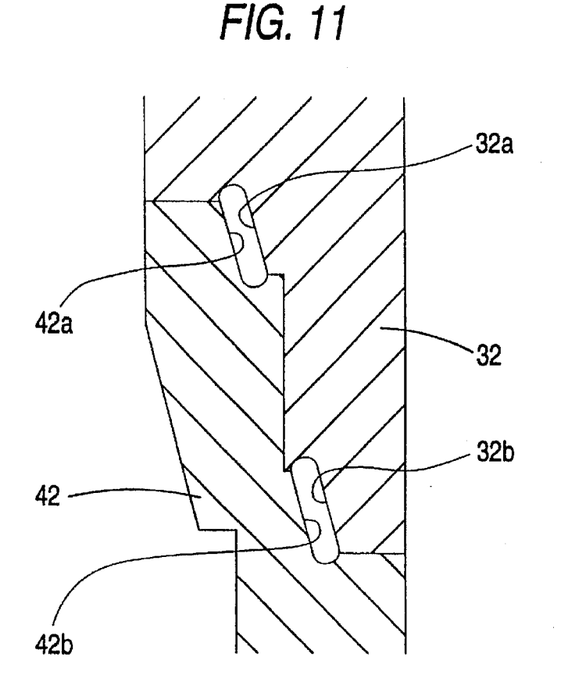
FIG. 11 is a section view illustrating separation walls in a closed state.

First, an outline of the molding die M will be described. As shown in FIG. 7, a movable mold 40 moves with respect to a stationary mold 30 in the direction of arrow A to open and close the molding die M. Two movable slide molds 50 are movable in the direction of arrow B, which is perpendicular to the mold moving direction A. As shown in FIG. 10, a cavity 31 is formed in a lower face of the stationary mold 30, to mold the rear portion of the connector housing 10 and the retainer 20. A cavity 41 to mold a front portion of the connector housing 10 is formed in an upper face of the movable mold 40. A number of pins (not shown) form the terminal chambers 12 and lances 13 for the connector housing 10 and project into the cavities 31 and 41. Since pins, such as described above, have a well-known structure used in known molding die for molding a connector housings, the pins are not shown to simplify the figures.

As described above, the internal structure of the connector housing 10 is molded in a similar fashion as in known devices. The die structure for molding the internal structures of the connector housing does not require special measures. When the connector housing 10 and the retainer 20 are simultaneously molded in an assembled state, they must be separate from each other. Therefore, the following countermeasure is taken, as described below, to assure the clearance and separation in the assembled state.

As shown in FIG. 7, the stationary mold 30 and the movable mold 40 comprise separation walls 32 and 42, which form the gaps G1 between the inner side faces of the side pieces 22 of the retainer 20 and the right and left outer side faces of the connector housing 10, respectively. Stationary mold 30 and movable mold 40 are shown in their closed positions in FIGS. 8 and 11. Matching faces of the separation walls 32 and 42 are formed so the first and second engaging projections 16 and 17 of the connector housing 10 are linearly sandwiched in a vertical direction.

Depressions 32a and 42a form the first engaging projections 16. Depressions 32b and 42b form the second engaging projections 17. The depressions 22a, 42a and 32b, 42b are formed in a recessed fashion in end faces of the engaging walls. Lower halves of the first engaging projections 16 are formed by through spaces in the depressions 32a and 42a in the mold closed state. The second engaging projections 17, which are smaller in height than the first engaging projections 16, are integrally formed on side faces of the connector housing 10 by closed spaces defined by corresponding depressions 32b and 42b, respectively.

Figure 12:
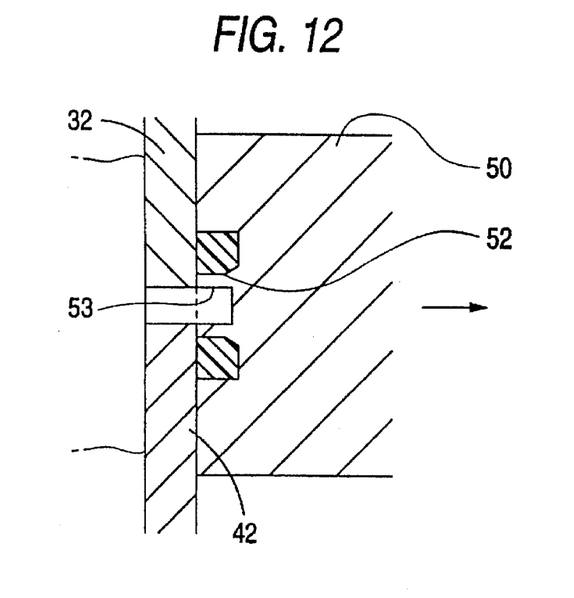
FIG. 12 is a section view of the molding die and illustrating molded portions of a first engaging projection of the connector housing and a slit of the retainer.

Front end faces of the slide molds 50 abut against the separation walls 32 and 42 in a mold closed state. As shown in FIG. 7, side-piece depressions 51, which form the right and left side pieces 22 of the retainer 20, are formed in a recessed manner in front end faces of the slide molds 50. FIG. 12 shows the slide molds 50 in the mold closed state. Slit ridges 52 that form the slits 23 of the retainer 20 are formed in the side-piece depressions 51. Slit ridges 52 project so their front end faces abut against the separation walls 32 and 42 in the mold closed state.

Ellipse-like depressions 53 are formed in the front end faces of the slit ridges 52. The interiors of the depressions 53 communicate with through spaces defined by the depressions 32a and 42a to form the upper halves of the first engaging projections 16.

The peripheral portions of the depressions 53 of the slit ridges 52 form gaps between the inner peripheral faces of the slits 23 and the first engaging projections 16. To reduce any backlash of the retainer 20, the peripheral portions of the depressions 53 preferably have a thickness as small as possible. However, this reduces the strength of the molds. Accordingly, each base of the slit ridges 52 spread out at their ends. Thus, the slits 23 of the retainer 20 have a tapered shape where their outer open ends are wider at their opposite portions. The strength of the molds is maintained by narrowing the gaps between the inner peripheral faces of the slits 23 and the first engaging projections 16.

Figure 9:
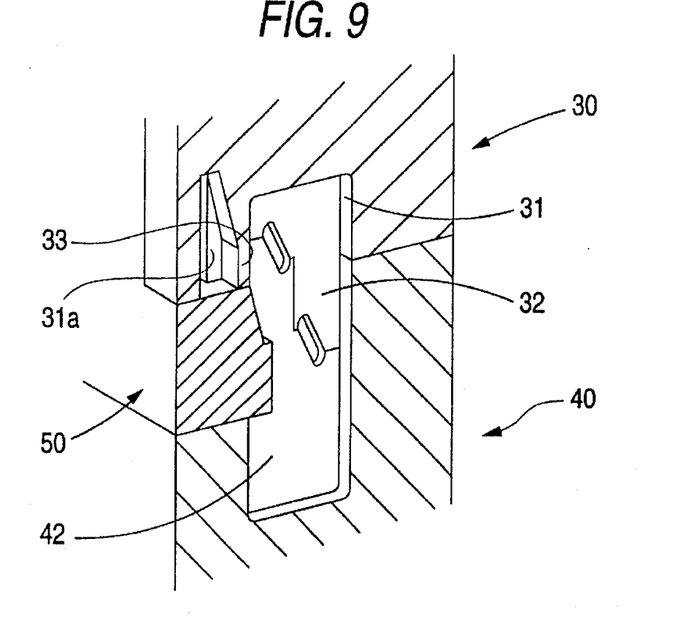
FIG. 9 is a perspective view in partial section illustrating the molding die in a closed state.

As shown in FIG. 9, a separation plate 33 forms the gap G2 between the outer face of the connector housing 10 and the retainer 20. The separation plate 33 projects downwardly from the stationary mold 30. The separation plate 33 is elongated in the mold closing and opening direction A of the movable mold 40.

When the molding die M is closed, and a resin is then poured therein, the connector housing 10 is integrally molded in the space formed by the cavity 31 on the lower face of the stationary mold 30 that communicates with the cavity 41 on the upper face of the movable mold 40. Also, the terminal chambers 12 and lances 13 of the connector housing 10, are formed by a number of pins (not shown) that project into the cavities 31 and 41.

The main part 21 of the retainer 20 is formed in the cavity 31a of the stationary mold 30, (in FIG. 9). The right and left side pieces 22 of the retainer 20 are formed by the side-piece depressions 51 of the slide molds 50 (FIG. 7). Since the cavity 31a, which forms the main part 21 of the retainer 20, is separated from the cavity 31 by the separation plate 33 of the stationary mold 30, the main part 21 of the retainer is not integrally formed with the connector housing 10.

In the mold closed state, the side-piece depressions 51 of the slide molds 50 are spaced from the cavities 31 and 41, which form the connector housing 10, by the separation walls 32 and 42. Therefore, the side pieces 22 of the retainer 20 are not integrally molded with the connector housing 10.

The slits 23 of the retainer 20 are formed by the front end faces of the slit ridges 52 of the slide molds 50 abutting against the separation walls 32 and 42. Consequently, the space, which forms the first engaging projections 16, does not communicate with the side-piece depressions 51 in the slide molds 50. Thus, the first engaging projections 16 of the connector housing 10 are not integrally molded with the side pieces 22 of the retainer 20. When all of the molds 30, 40, and 50 are opened after the resin is poured and set, the separation walls 32 and 42, the separation plate 33, and the slit ridges 52 are smoothly extracted from the gaps G1 and G2 between the connector housing 10 and the retainer 20. Thus, the connector housing 10 and the retainer 20 can be removed from the molding die.

The first engaging projections 16 of the connector housing 10 are molded so they are project into the slits 23 of the retainer 20. Thus, the retainer 20 is attached to, but separate from, the connector housing 10. It is thus not necessary to separately attach the connector housing 10 and retainer 20. Therefore, the production cost can be greatly reduced.

Further, the bases of the slit ridges 52 form the slits 23 of the retainer 20 and are spread out at their ends in a tapered shape. Thus, the peripheral portions of the depressions 53 of the slit ridges 52 are thicker. This permits the gaps between the inner peripheral faces of the slits 23 and the first engaging projections 16 to be smaller and the strength of the molds is maintained at a high level, while suppressing any backlash of the retainer 20. Accordingly, the overall durability of the connector assembly 1 can be improved.

The invention is not restricted to the embodiment disclosed and illustrated by the above description and drawings. For example, other configurations may be possible without departing the spirit of the invention. In the embodiments described above, the retainer 20 is molded as an independent part, which is separate from the connector housing 10. Alternatively, the retainer 20 may be integrated with the connector housing 10 through a connecting part, such as a hinge, a connecting string and the like.

Further, the retainer 20 is shown as disposed on the upper face of the connector housing 10. However, the connector 1 may have its terminal chambers 2 arranged in two or more rows in the connector housing 10. A retainer 20 may then be disposed on each of the upper and lower faces of the connector housing 10.

Figure 13:
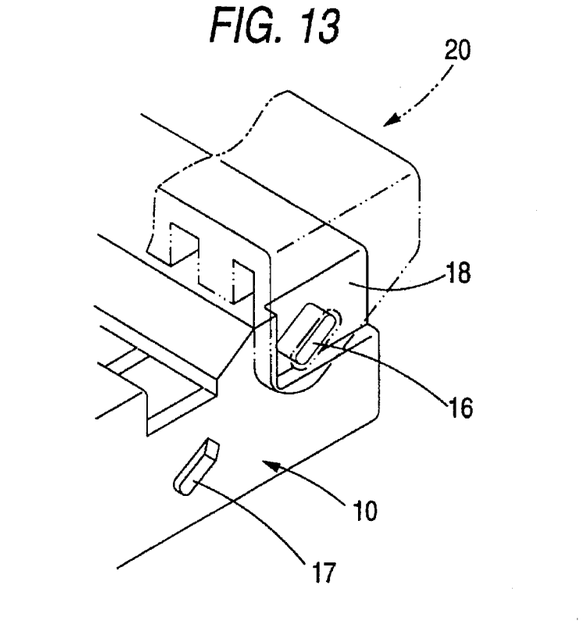
FIG. 13 is a partial perspective view of a connector showing a second preferred embodiment of the invention.
Figure 14:
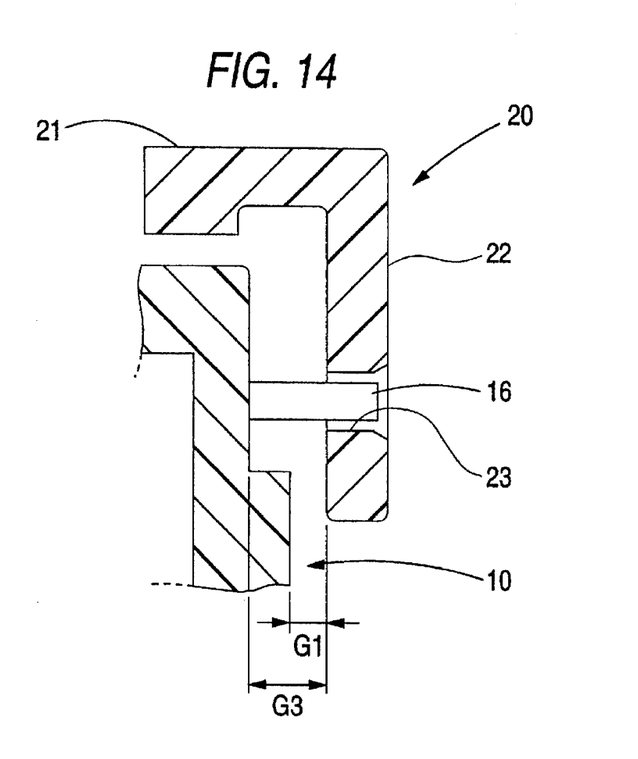
FIG. 14 is a section view of the connector and illustrating a first engaging projection of the connector housing and a slit of the retainer in the second preferred embodiment.

FIGS. 13 and 14 show another preferred embodiment of the invention to increase the durability of a molding die M. In FIGS. 13 and 14, the thickness of the separation walls 32 and 42 corresponds to the gaps G1 between the connector housing 10 and the retainer 20. In order to reduce any backlash of the retainer 20, it is desirable to provide the separation walls 32 and 42 with a thickness as small as possible. However, the decrease of the thickness of separation walls 32 and 42 reduces the durability of the molding die M. Thus, the decrease of the thickness is limited. Accordingly, thickness-reducing depressions 18 can be formed in the side faces of the connector housing 10 as shown in FIG. 13. Thick portions 32c and 42c are correspondingly formed in the separation walls 32 and 42 of the stationary and movable molds 30 and 40 to form the depressions 18. This increases the strength of the separation walls 32 and 42. Accordingly, any backlash of the connector housing 10 and the retainer 20 can be suppressed, while enhancing the durability of the molding die M.

While this invention has been described in conjunction with specific embodiments thereof, is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A connector assembly comprising:

a connector housing comprising side walls and an outer face; and a retainer comprising a pair of side pieces that are respectively placed on corresponding ones of the side walls of the connector housing, the retainer being attached to the connector housing and movable between a provisional engagement position and a regular engagement position, the retainer further comprising at least one engagement projection, the at least one engagement projection holding a terminal piece in the connector housing to prevent the terminal piece from slipping out of the connector housing when the retainer reaches a regular engagement position, and the at least one engagement projection being removable from the connector housing to permit the terminal piece to be inserted into and removed from the terminal housing when the retainer is in a provisional engagement position; wherein the at least one engagement projection, when in the provisional engagement position, is spaced from the outer face of the connector housing so as to define a gap between the at least one engagement projection and the outer face of the connector housing.

2. A connector assembly according to claim 1, the connector housing further comprises a plurality of terminal chambers and wherein a said terminal piece is disposed within each respective terminal chamber.

3. A connector assembly according to claim 2, wherein the connector housing further comprises an elastically deformable lance in each of the plurality of terminal chambers, the lance retaining a corresponding terminal piece within the respective terminal chamber.

4. A connector assembly according to claim 1, wherein the connector housing comprises at least one projection on each of the side walls, the retainer comprising at least one slit formed in each of the pair of side pieces, wherein each at least one projection fits in a corresponding one of the at least one slit formed on the pair of side pieces in one of the regular engagement position and the provisional engagement position.

5. A connector assembly according to claim 4, wherein the at least one projection comprises two projections on each side wall of the connector housing, and a first projection is inserted into the at least one slit in the provisional engagement position and the second of the two projections is inserted into at least one slit in the regular engagement position.

6. A connector assembly according to claim 5, wherein one of the two projections on the connector housing is disposed in a depression in each corresponding side wall of the connector housing.

7. A connector assembly according to claim 1, further comprising at least one terminal piece, wherein the at least one terminal piece is a female terminal that includes a connection tube, an engaging hole and a jaw, wherein each terminal chamber of the connector housing includes a elastically deformable lance that cooperates with the engagement hole, the retainer includes at least one engagement projection that cooperates with the jaw to hold the at least one terminal piece in the connection housing.

8. A method for producing a connector assembly, the connector assembly comprising a connector housing including side walls and an outer face; and a retainer comprising a pair of side pieces that are respectively placed on corresponding ones of the side walls of the connector housing, the retainer being attached to the connector housing and movable between a provisional engagement position and a regular engagement position, the retainer further comprising at least one engagement projection, the at least one engagement projection holding a terminal piece in the connector housing to prevent the terminal piece from slipping out of the connector housing when the retainer reaches a regular engagement position, and the at least one engagement projection being removable from the connector housing to permit the terminal piece to be inserted into and removed from the connector housing when the retainer is in a provisional engagement position; wherein the engagement projection, when in the provisional engagement position, being spaced from the outer face of the connector housing so as to define a gap between the at least one engagement projection and the outer face of the connector housing;

the method comprising:

moving a molding die part to form the gap between the at least one engagement projection and the outer face of the connector housing; and inserting resin into the molding die, thus molding the connector housing and the retainer as separate pieces, with the retainer attached to the connector housing.

9. A method according to claim 8, further comprising molding a plurality of terminal chambers to hold a plurality of terminal pieces.

10. A method according to claim 9, further comprising molding a plurality of elastically deformable lances in each of the plurality of terminal chambers, each lance retaining a corresponding terminal piece within the respective terminal chamber.

11. A method according to claim 8, further comprising:

molding at least one projection on each side wall of the connector housing;

molding at least one slit in each of the pair of side pieces of the retainer;

wherein each at least one projection fits within a corresponding one of the at least one slit in one of the regular engagement position and the provisional engagement position.

12. A connector assembly according to claim 11, molding at least two projections on the connector housing in a depression on each corresponding side wall of the connector housing.

13. A molding die for producing a connector assembly, the connector assembly comprising a connector housing including side walls and an outer face; and a retainer comprising a pair of side pieces that are respectively placed on corresponding ones of the side walls of the connector housing, the retainer being attached to the connector housing and movable between a provisional engagement position and a regular engagement position, the retainer further comprising at least one engagement projection, the at least one engagement projection holding a terminal piece in the connector housing to prevent the terminal piece from slipping out of the connector housing when the retainer reaches a regular engagement position, and the at least one engagement projection being removable from the connector housing to permit the terminal piece to be inserted into and removed from the terminal housing when the retainer is in a provisional engagement position, in the at least one engagement projection, when in the provisional engagement position, being spaced from the outer face of the connector housing define a gap between the at least one engagement projection and the outer face of the connector housing;

the molding die comprising:

at least one elongated separation plate extending longitudinally in a mold opening and closing direction, the at least one separation plate entering a space to define the gap between the at least one engagement projection and an outer face of the connector housing; wherein the connector housing and the retainer are molded as separate pieces in an assembled condition.

14. A molding die according to claim 13, wherein the die further includes a movable mold, a stationary mold and at least two slide molds.

15. A molding die according to claim 14, wherein the at least one elongated separation plate extends from the stationary mold.

16. A molding die according to claim 13, wherein the stationary and movable molds each include at least one separation wall, each separation wall including an increased thickness portion for forming a depression in corresponding side walls of the connector housing.

17. A molding die according to claim 13, wherein the connector housing comprises at least one projection on each side wall, the retainer comprising at least one slit formed in each of the pair of side pieces, wherein the at least one projection fits in a corresponding one of the at least one slit formed on the pair of side pieces in one of the regular engagement position and a provisional engagement position;

wherein the at least two slide molds further comprise at least one slit ridge for forming the at least one slit in the retainer, and the at least two slide molds comprising at least one depression for forming at least one projection.

18. A molding die according to claim 17, wherein the molding die forms two projections on the side walls of the the connector housing.

19. A molding die according to claim 16, wherein the molding die forms two projections on the side walls of the connector housing and one of the two projections is formed in the depression area in the corresponding side walls of the connector housing.

* * * * *